United States Patent [19]

Padera

[11] Patent Number: 4,828,376

[45] Date of Patent: May 9, 1989

[54] TRIAXIS STABILIZED PLATFORM

[75] Inventor: Charles J. Padera, Winter Park, Fla.

[73] Assignee: Martin Marietta Corporation, Bethesda, Md.

[21] Appl. No.: 15,250

[22] Filed: Feb. 17, 1987

[51] Int. Cl.$^4$ .............................................. G02B 27/64
[52] U.S. Cl. ..................................... 350/500; 269/75; 248/183
[58] Field of Search .............. 350/500, 567, 568, 632, 350/636, 637; 74/5.22; 248/182, 183; 269/71, 73, 75

[56] References Cited

U.S. PATENT DOCUMENTS

| | | | |
|---|---|---|---|
| 3,267,257 | 8/1966 | Shippey et al. | 61.5/235 |
| 3,611,785 | 10/1971 | Hanson. | |
| 3,703,999 | 11/1972 | Forys et al. | 248/20 |
| 4,033,541 | 7/1977 | Malveg | 248/358 R |
| 4,062,126 | 12/1977 | O'Hara et al. | 33/236 |
| 4,068,538 | 1/1978 | Butler et al. | 74/5.22 |
| 4,258,578 | 3/1981 | Kennel | 74/5.34 |
| 4,443,743 | 4/1984 | Forys et al. | 318/115 |

FOREIGN PATENT DOCUMENTS

| | | |
|---|---|---|
| 3122695 | 1/1983 | Fed. Rep. of Germany. |
| 2325974 | 4/1977 | France. |
| 2405582 | 5/1979 | France. |
| 2452193 | 10/1980 | France. |
| 0113267 | 12/1982 | France. |

Primary Examiner—Bruce Y. Arnold
Assistant Examiner—Jay Ryan
Attorney, Agent, or Firm—MacDonald J. Wiggins; Gay Chin

[57] ABSTRACT

A stabilized platform having five degrees of freedom utilizes a platform supported on a base by a spherical bearing which permits movement about roll, pitch and yaw axes. A triaxis torquer has a non-magnetic stator depending from the platform, permanent magnet rotors disposed on the base which produce a magnetic field through the stator, and a set of electrical windings attached to the stator. Energizing the windings selectively produces torque in roll, pitch and yaw. A mirror gimbal and drive system on the platform provides movement in elevation of a mirror. A motor is provided for rotating the base in azimuth relative to its mounting in a vehicle or the like. A set of rate gyroscopes mounted on the platform and a set of resolvers provide rate of movement of the platform and gimbal, and position information to a servo system which controls the torquers and drive systems to stabilize the platform in roll, pitch and yaw, and to position the mirror in elevation and azimuth. Laser and infrared optical devices may be mounted on the platform and coupled by the mirror to a desired line of sight.

32 Claims, 5 Drawing Sheets

TRIAXIS STABILIZED PLATFORM

BACKGROUND OF THE INVENTION

1. Field of the Invention

The present invention relates to a stabilized platform for electro-optical sensor, and more particularly to an inertially stabilized platform utilizing a triaxis torquer.

2. Description of the Prior Art

Existing electro-optical fire control sensor configurations use heavy, large diameter spheres having high drag coefficients and large radar cross sections. When a fire control sensor is to be used on high performance military rotorcraft, it is necessary to mount the sites on the rotorcraft nose or on the rotor mast. The known prior art configurations are not suitable for such mountings. Thus, lower profile, streamlined configurations are needed. Advances in forward looking infrared sensor (FLIR) performance have required that the stabilization performance of any new compact sensor package must be as good as in the larger existing designs and improved stabilization performance is highly desirable.

Thus, there is a requirement for a lightweight, low drag, low cross section turret which will have precise stabilization performance with low radar signature and low gross mission weight for use with helicopters having a top speed in excess of 200 knots. Such a design should also be compatible with other vehicles such as fixed wing aircraft and land vehicles. To be able to provide a low drag, lightweight, low radar signature electro-optical turret design which will be compatible with advanced helicopter designs, a compact stabilized platform is required which will have a maximum stabilization error of 10 micro-radian when used in such environments.

SUMMARY OF THE INVENTION

The present invention includes an inertially stabilized platform supported by a single spherical bearing in which the platform position is controlled in inertial space by a triaxis torquer.

The invention includes an essentially horizontal platform which is supported by a single spherical bearing assembly. Thus, the platform is able to move in pitch, yaw and roll. As will be discussed below, the degree of pitch, yaw and roll may be limited to ±5 degrees providing large fields of regard for the sensors.

A triaxis torquer is coupled to the platform for providing the required restoring forces after a displacement of the platform. The stator of the torquer is a thin wall, non-magnetic element which, in one implementation of the invention, is essentially hemispherical although other shapes may be used. The rotor of the torquer includes eight segments adjacent the stator which use magnets and iron poles. Two segments spaced at 180 degrees are used for pitch control, two segments spaced at 180 degrees and oriented 90 degrees from the pitch segments are used for roll control, and four segments disposed between the pitch and roll segment are used for yaw control. Copper wire coils are attached opposite the magnet segments on both the inside and outside walls of the stator. The yaw segment coils are wound parallel to the centerline of the stator, and the pitch and roll coils are circumferentially wound. Elimination of magnetic materials in the stator prevents undesirable hysteresis effects.

Pitch, roll and yaw rate integrating gyroscopes (RIG) are appropriately mounted to the stabilized platform to provide signals to a set of three conventional servo loops which provide excitation to the torquer rotor segments as required. A set of pitch, yaw, and roll resolvers is mounted to the base of the platform and coupled to the platform to provide position information.

Advantageously, the spherical bearing and torquer design of the invention permits a very low profile stabilized platform to be provided. FLIR, lasers, television cameras, and other elements of optical systems can be supported by the platform.

In one application of the invention, the stabilized platform is utilized as an optical bed and is mounted to an azimuth gimbal and covered by a shroud. A gimbaled mirror controllable in elevation by a rotary torquer and resolver is mounted on the stabilized optical bed for directing incoming radiation to certain optical devices mounted on the optical bed. The mirror gimbal provides about +45 degrees of freedom in elevation. The pitch and yaw sensing gyros are mounted to the mirror assembly to maintain the optical bed centered within the shroud to within ±3 degrees.

The roll gyro is mounted to the optical bed which is controlled within the shroud to within ±3 degrees using a resolver sensor. The azimuth gimbal and shroud are rotatable over ±180 degrees to follow external movement of the optical bed in azimuth. The shroud includes a transparent window adjacent the mirror. As will be recognized, the system provides five degrees of freedom. Typical optical devices used in this application include a laser designator-tracker, a TV tracker and FLIR.

It is therefore a principal object of the invention to provide an inertially stabilized platform supported by a single spherical bearing and having a triaxis torquer for control of the platform position.

It is another object of the invention to provide a stabilized platform having a low profile for use in a lightweight, low drag, low radar cross section turret suitable for high speed rotor craft applications.

It is still another object of the invention to provide a stabilized platform having an improved triaxis torquer utilizing a hemispheric non-magnetic stator and a segmented rotor spaced to provide control of the platform in pitch, roll and yaw.

It is yet another object of the invention to provide a system for optical tracking of targets in which a stabilized mirror is controllable in elevation, and a three-axis stabilized platform is controllable in azimuth.

These and other objects and advantageous of the invention will become apparent from the following detailed description when read in conjunction with the drawings.

DETAILED DESCRIPTION OF THE PREFERRED EMBODIMENT

Figure 1:
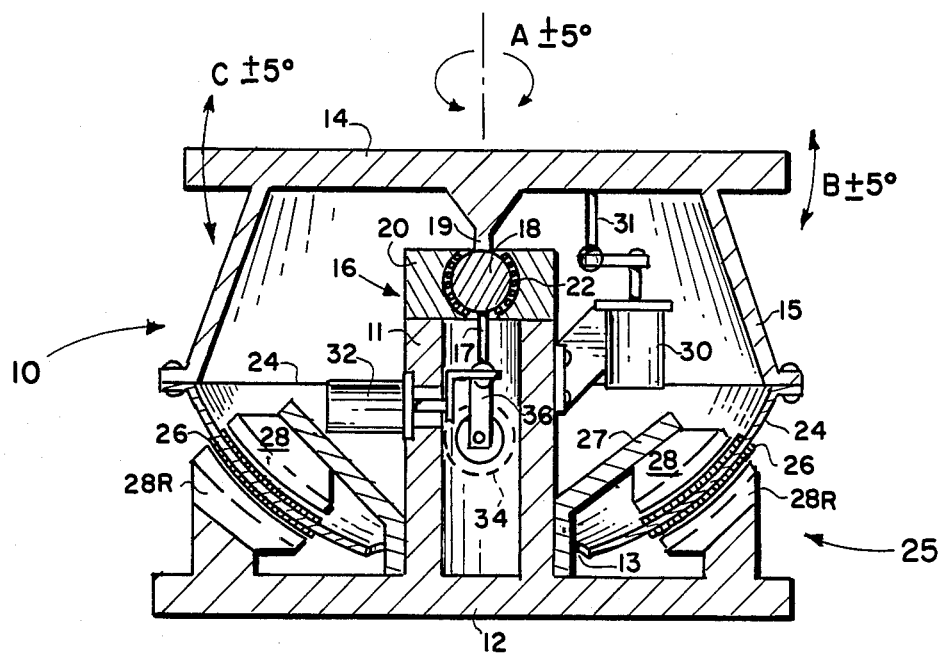
FIG. 1 is a vertical cross-sectional view of a platform showing the spherical bearing and triaxis torquer.

Referring to FIG. 1, a vertical cross-sectional view of a controllable platform 10 in accordance with the invention is shown. A base 12, is provided which may be circular or any desired shape, and includes a tubular center post 11. The cross-section of FIG. 1 is through the centerline of base 12 and post 11. A single spherical bearing assembly 16 is disposed on post 11 and includes an outer race 20, an inner race 18, and ball bearings 22.

A normally horizontal platform 14 is attached to the inner race 18 of spherical bearing 16 by post 19. As will be noted, clearance in outer race 20 for post 19 is provided to permit platform 14 to pivot with respect to base 12 in any direction for a selected distance. For example, a movement from the horizontal of platform 14 of ±5 degrees may be provided. Thus, a set of three axes may be defined for platform 14: a yaw axis A; a roll axis B; and a pitch axis C. A set of three resolvers 30, 32, and 34 is mounted to post 11 and coupled to platform 14. Pitch resolver 32 and roll resolver 34 are coupled to bearing race 18 by rod 17 and universal joint 36. Yaw resolver 30 is coupled to platform 14 by rod and joint 31. Resolvers 30, 32 and 34 provide position information to a control system discussed hereinafter.

A skirt 15 depends from platform 14 and supports a stator 24 of triaxis torquer 25. Stator 24 is formed from a non-magnetic conductive material such as aluminum, and is essentially hemispherical with a central opening 13. As will be noted, stator 24 is disposed over and concentric with centerpost 11. The size of opening 13 is selected to permit platform 14 to move in roll and pitch about +5 degrees.

Figure 2:
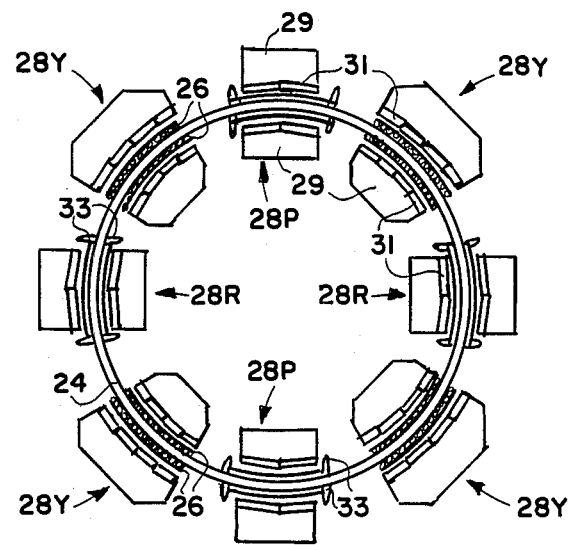
FIG. 2 is a horizontal cross-section through the triaxis torquer of FIG. 1.
Figure 3:
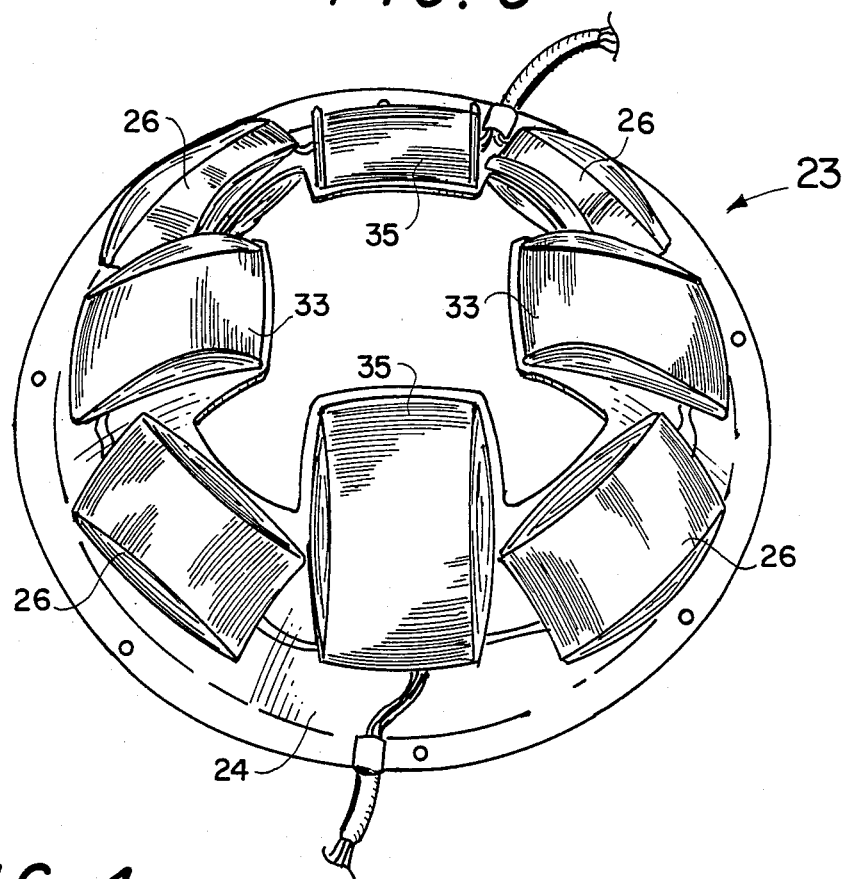
FIG. 3 is a perspective top view of the triaxis torquer stator showing the stator coils.

FIG. 3 shows a top perspective view of the stator assembly 23. Stator coils 33, 35, and 26 are wound in pancake-type form and are attached to the outer and inner surfaces of hemispherical stator 24. A set of rotors 28 is mounted to base 12 with roll rotors 28R seen in FIG. 1. Details of rotors 28 are best seen with reference to FIGS. 2 and 4. Each rotor 28 includes a set of soft iron pole pieces 29 and a set of permanent magnets 31. Although other magnetic materials may be used for magnets 31, SmCo is preferred. Rotors 28 are arranged to produce a magnetic field at right angles to the surface of stator 24 through stator coils 33, 35 and 26. As shown schematically in FIG. 2 and FIG. 4, windings 31 and 33 have the operative portions of their windings in a plane at right angles to the axis of stator 24. Thus, the interaction of current flowing in such windings with the magnet fields from permanent magnets 31 will create a torque to rotate platform 14 either in pitch or roll. Coils 26 are at right angles to coils 33 and 35 and therefore the effective windings are aligned with the axis of stator 24 and interaction with magnets 31 when current is flowing therethrough causes platform 14 to tend to rotate about its vertical axis.

Figure 4:
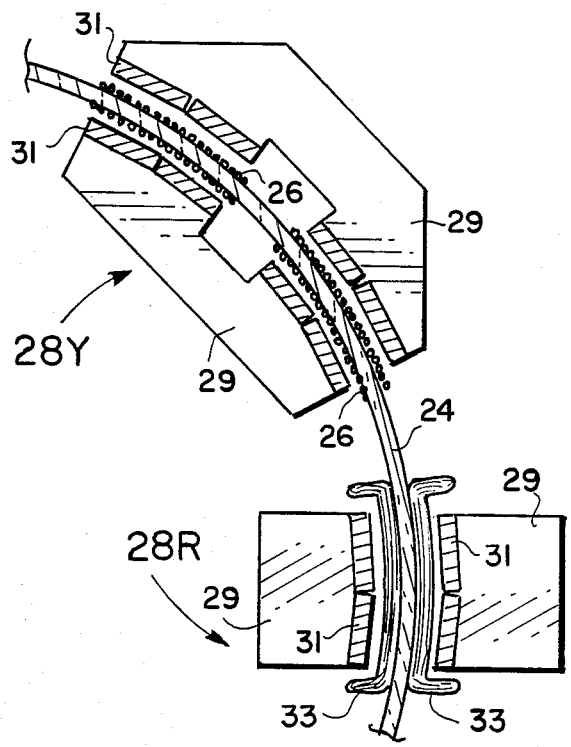
FIG. 4 is a partial horizontal cross-sectional view of the triaxis torquer showing details of the rotors and the stator coils.

Referring to FIG. 4, rotor 28R consisting of soft iron pole pieces 29 with magnet segments 31 attached thereto can be seen to produce a magnetic gap therebetween in which roll rotor coils 33 are disposed. The size of coil 33 and the width of rotors 29 are such that about ±5 degrees of rotation is possible. As will be discussed hereinafter, the system is to be stabilized to maintain centering within about ±3 degrees. Due to the greater torque required to move platform 14 in yaw, four sets of yaw stator windings 31 (shown schematically in FIGS. 2 and 4) are provided along with rotor pole pieces 28Y having a soft iron portion (29) disposed on either side of the stator 24 and having a set of four magnets 31 on each pole piece adjacent the stator coils 26. As will be noted in FIG. 4 in which a concentric cross-section of stator 24 is indicated, the effective windings 26 are at right angles to the plane of the paper while the windings of stator coils 33 are in the plane of the paper.

FIG. 2 is a horizontal cross-section through stator 24 showing a pair of pitch rotors 28P and a pair of roll rotors 28R at right angles thereto. As previously mentioned, four yaw rotors 28Y are disposed around the circumference of stator 24 and spaced between the pitch and roll rotors 28P and 28R.

Figure 5:
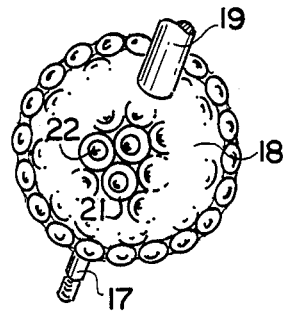
FIG. 5 is a perspective view of the inner race and bearings of the spherical bearing of FIG. 1.

Details of the inner race of spherical bearing assembly 16 is shown in FIG. 5 having an inner ball race 18, a ball retainer 23, and ball bearings 22. Bearing 16, as shown in FIG. 1, provides platform 14 with 3 degrees of freedom with limits of about ±5 degrees as indicated by arrows A, B and C.

Figure 6:
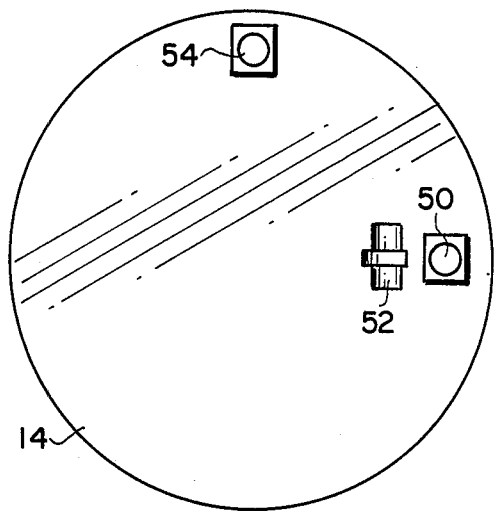
FIG. 6 is a top view showing the platform of the device of FIG. 1 illustrating typical placement of the rate integrating gyroscopes.

As will be obvious to those of skill in the art and referring to FIG. 6, the platform system 10 can utilize a set of roll, pitch and yaw gyroscopes attached to platform 14 and connected in a conventional servo loop to maintain platform 14 stabilized and therefore correct for any inertial disturbance or other movements which might cause the platform to move with respect to base 12. Thus, the system provides a three axis stabilized platform which can support optical devices or the like and which is very compact and can be constructed of lightweight materials.

Figure 7:
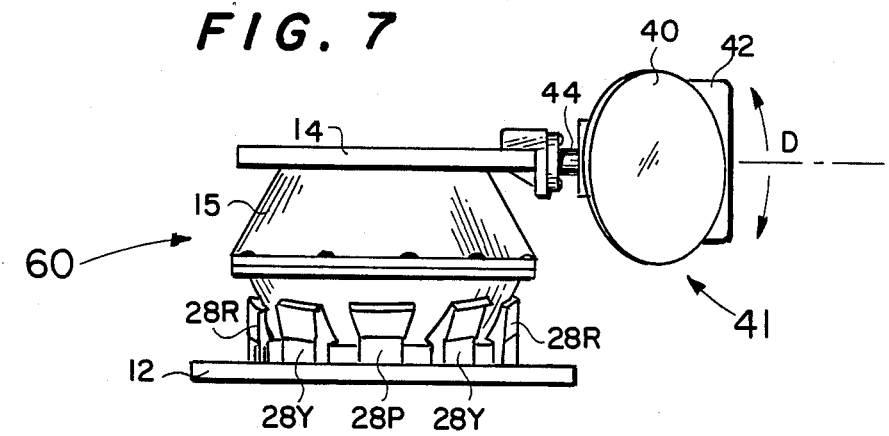
FIG. 7 is a side view of a platform of FIG. 1 having a single axis mirror assembly attached thereto.

In a specific application of stabilized platform 10, a 5 degree of freedom system may advantageously be provided. In FIG. 7, stabilized platform 10 has a one axis gimbaled mirror assembly 41 attached thereto producing a four degree-of-freedom system. As seen in the top view of the system 60 of FIG. 7, mirror assembly 41 is arranged in an "A" configuration having a mirror 40 and a mirror 42 at essentially right angles to each other and supported by a rotatable shaft 46. Shaft 46 is coupled to rotary torquer 53T and resolver 53R. Preferably, torquer and resolver 53 have the capability of moving mirror assembly 41 in elevation over a range of about ±45 degrees as indicated by arrows D. To provide means for stabilization of this application of the invention, a pitch axis gyroscope 50 and a yaw axis gyroscope 52 are mounted on movable mirror assembly 41. Roll axis gyroscope 54 is attached to platform 54.

Figure 8:
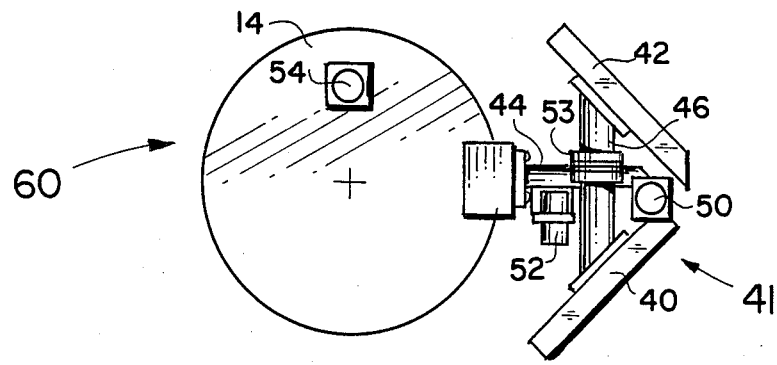
FIG. 8 is a top view of the device of FIG. 7.
Figure 9:
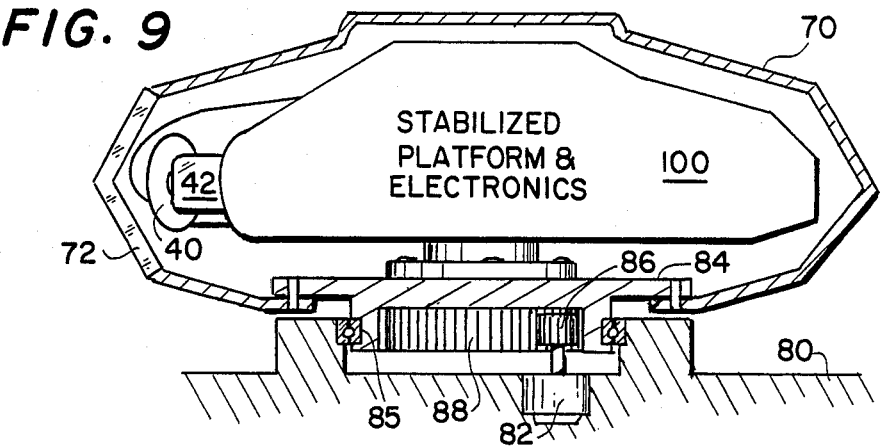
FIG. 9 is cross-sectional view of the stabilized platform of FIGS. 7 and 8 having electro-optical devices supported thereby and enclosed by a shroud and an azimuth control system.

Although not shown in FIGS. 7 and 8, various optical devices coupled to mirrors 40 and 42 are to be supported by platform 14. In FIG. 9, a typical configuration is shown in partial cross-sectional view. The stabilized platform 60 of FIG. 7, in accordance with the invention, has certain optical and electronic devices attached to the platform portion thereof indicated generally as reference numeral 100. The mirrors 40 and 42 extend therefrom and are adjacent to a transparent window 72 in shroud 70, shown in cross-section. As will be noted, shroud 70 is connected to an azimuth gimbal 84 rotatably mounted to a vehicle structure 80, which may be for example a helicopter, tank or other vehicle. Azimuth gimbal 84 is supported by a ring bearing 85 such that it may rotate with respect to structure 80. A drive motor and resolver 82 is mounted to structure 80 and coupled to base 84 via spur gear 86 and ring gear 88. Motor 82 may therefore rotate azimuth gimbal 84, platform and electronics 100 and shroud 70 over ±180 degrees. As azimuth gimbal 84 and platform base 12 are rotated by motor 82, the yaw torquer 28Y is controlled to maintain platform 14 and mirror assembly 41 centered in shroud 70 and window 72. As will now be recognized, the system of FIG. 9 will have 5 degrees of freedom; i.e., roll, pitch, yaw, elevation and azimuth.

Figure 10:
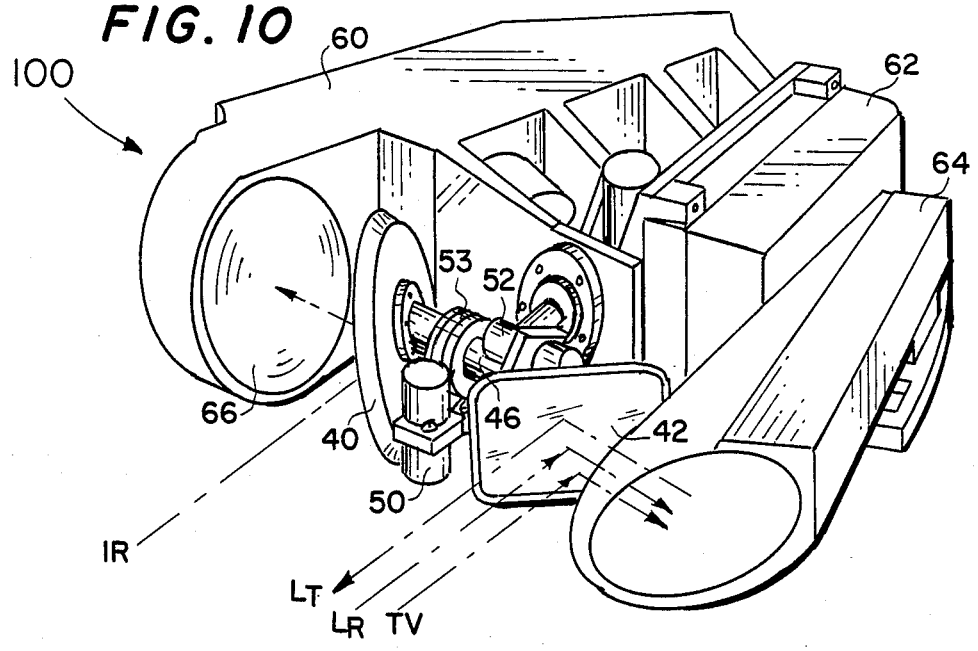
FIG. 10 shows a perspective view of opto-electronic devices typically supported by the stabilized platform of FIGS. 7 and 8.
Figure 11:
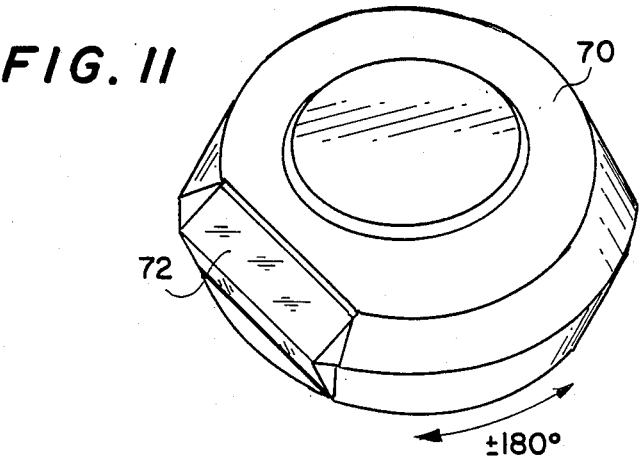
FIG. 11 shows a shroud suitable for enclosing the system of FIG. 10.

The configuration of FIG. 9 has been applied to a compact, lightweight system shown with the shroud removed in FIG. 10. Elements of the system are a FLIR 60, a laser designator-tracker 62, and a TV tracker 64. These elements are mounted to the stabilized platform 14 of the invention (not visible in the drawing). Mirrors 40 and 42 are attached to the platform and mount pitch axis gyroscope 50 and yaw axis gyroscope 52 as previously described. Mirrors 40 and 42 are controlled in elevation by rotary torquer and resolver 53. In the example of FIG. 10, infrared energy incident on mirror 40 is reflected through lens system 66 to the FLIR while incident laser return energy and visible light representing a TV image are reflected by mirror 42 into the laser tracker 62 and TV tracker 64. The transmitted laser beam is also reflected by mirror 42 along the line of sight of mirror 42. A typical low profile shroud for the assembly of FIG. 10 is shown in FIG. 11. Shroud 70 includes a transparent window 72 through which the IR, laser and television images arrive at mirrors 40 and 42.

A simplified block diagram of a servo, control and tracking system utilizing the stabilized platform configuration of FIG. 9 is shown. Base 12 supports roll torquer 28R, pitch torquer 28P and yaw torquer 28Y, with roll resolver 34, pitch resolver 32 and yaw resolver 30 coupled to platform 14 as previously described. Platform 14 also supports mirror gimbal 41. Roll rate integrating gyroscope (R.I.G.) 54 is mounted to platform 14 while pitch R.I.G. 50 and yaw R.I.G. 52 are mounted to mirror gimbal 41. Elevation resolver 53R is coupled to mirror gimbal 41.

Conventional pitch servo system 104, yaw servo system 90 and roll servo system 102 are utilized to control elevation torquer 53T and platform torquers 28 responsive to signals from R.I.G.'s 50, 52 and 54 to maintain platform 14 and mirror gimbal 41 in a required attitude. The design of suitable servo systems is well known in the art.

A control computer 130 receives position information from elevation resolver 53R, azimuth resolver 82R, roll resolver 34, pitch resolver 32 and yaw resolver 30. Computer 130 also receives commands from tracker system 106 and manual control system 108. As required by such attitude information and commands, servo systems 90, 102 and 104 are controlled to maintain platform 14 and mirror gimbal 41 in a required attitude.

For example, in tracking a target, elevation torquer 53T may move the line-of-sight of mirrors 40 and 42 (FIG. 10) ±45 degrees in elevation while the roll, pitch and yaw torquers 28 maintain platform 14 level with respect to base 12. As a target moves in azimuth, azimuth motor is controlled by yaw servo system 90 to rotate base 12 and shroud 70 over ±180 degrees while yaw resolver 30 and yaw torquer 28Y maintain platform 14 centered within shroud 70 and window 72.

Figure 12:
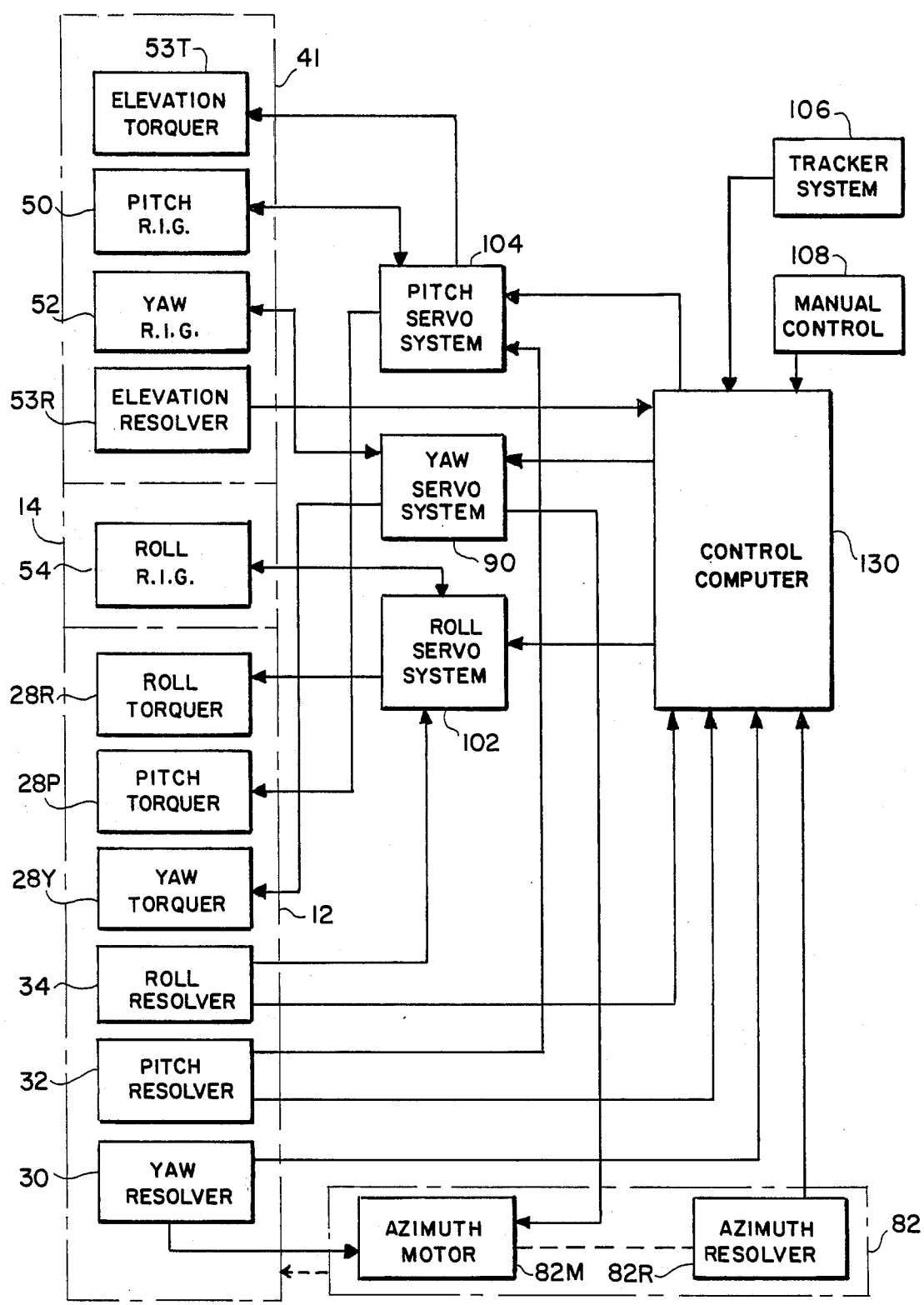
FIG. 12 is a simplified block diagram of the servo, control and tracking systems for use with the stabilized platform of FIG. 9.

The operation of the system indicated in FIG. 12 will be described using a helicopter mounted system for exemplary purposes. There are two regimes of stabilization required in such application. First, when no wide angle maneuvers are being carried out, the system must stabilize the line-of-sight of the optical system against the helicopter vibration and on-gimbal disturbance sources. Mechanical isolation is provided by the spherical bearing and dynamic balancing of the gimbal. The stabilization servo loops in pitch, yaw and roll using the rate integrating gyros 50, 52 and 54 maintain the platform essentially centered within the shroud 70 and have fast enough response time to correct for vibration.

To isolate against the wide angle helicopter maneuvers, the system operates in three axes as follows:

The azimuth gimbal which carries the shroud is controlled to follow the yaw inertial position of the optical bed within ±3 degrees using a resolver to measure the optical bed gimbal position. Thus, the azimuth gimbal provides the wide angle isolation in this axis. In pitch, the optical bed is controlled to remain centered within the shroud during a maneuver within ±3 degrees using a resolver sensor to measure the optical bed pitch position while the mirror pitch gimbal provides the wide angle freedom in the elevation axis. In roll, the optical bed is controlled to maintain the bed centered in the shroud within ±3 degrees, also using a resolver sensor.

As will be noted, the yaw gyroscope is mounted on the mirror pitch gimbal to control the roll-to-image motion coupling induced at large pitch gimbal angles.

Although a preferred embodiment of the invention has been disclosed in the drawings and the description, it is apparent that many variations in design and construction may be made to adapt the invention to specific applications. Such modifications are considered to fall within the spirit and scope of the invention.

I claim:

1. A stabilized platform assembly comprising:
   (a) a base;
   (b) a platform;
   (c) bearing means for attaching said platform to said base such that said platform is movable relative to said base about one or more of three mutually orthogonal axes;
   (d) a stator having a wall formed from non-magnetic material having a wall formed from non-magnetic material attached to said platform and supported in a spaced relationship proximate said base; and
   (e) force producing means on said base and said stator for controllably rotating said platform about one or more of said axes, said force producing means including a first means for producing a first field of magnetic flux extending into the space between said base and said stator, and a second means for producing a second field of magnetic flux extending into said space for interaction with said first field, said spaced relationship placing said stator within said first and second fields of magnetic flux such that the interaction of said first and second fields produces a resultant force on said stator that moves said platform to a predetermined position of alignment relative to said base, said first means for producing a magnetic field being a magnet, and said second means for producing a magnetic field being an electrical coil winding, said magnets being disposed in pairs with said stator wall therebetween so as to form a magnetic gap through said wall.

2. A controllable platform system having freedom to move about in three mutually orthogonal axes comprising:
   a base;
   a platform having an essentially horizontal plane;
   a bearing movably supporting said platform on said base;
   a stator having a wall formed from non-magnetic material attached to and depending from said platform;
   a plurality of first means attached to said base for producing magnetic fields, each of said first means adjacent said stator wall, said first means arranged to produce a plurality of first magnetic fields transverse to and through said stator wall; and
   a plurality of second means attached to said stator wall for producing magnetic fields, each of said second means disposed within one of said first magnetic fields wherein selective excitation of said second means by an electrical current causes said platform to move about one or more of said three axes, said first means for producing a magnetic field being a magnet; and said second means for producing a magnetic field being an electric coil winding, said magnets being disposed in pairs with said stator wall therebetween so as to form a magnetic gap through said wall.

3. The system as recited in claim 2 in which said stator is an annular segment of a hemisphere.

4. The system as recited in claim 3 in which said stator is formed of aluminum.

5. The system as recited in claim 2 in which said electrical coil windings are wound in pancake-type form.

6. The system as recited in claim 2 in which magnets are permanent magnets.

7. The system as recited in claim 6 in which said magnets are of samarium cobalt.

8. The system as recited in claim 6 in which said coil windings are disposed in pairs and attached to said wall with one of said pair on each side of said wall, and with said pair within said magnetic gap.

9. The system as recited in claim 7 in which:
   said platform is movable about said three axes in roll, pitch and yaw directions;
   a first pair of said magnets and a first pair of said coil windings are disposed along a first of said axis such that energizing said first of said pair of coil windings results in movement of said platform in roll;
   a second pair of said magnets and a second pair of said coil windings are disposed along a second of said axes such that energizing said second pair of coil windings result in movement of said platform in pitch; and
   a third pair of said magnets and a third pair of said coil windings are disposed along a third of said axes such that energizing said second pair of coil windings result in movement of said platform in yaw.

10. The system as recited in claim 9 which further comprises:
    roll, pitch, and yaw resolvers mounted to said base and each of said resolvers operatively connected to said platform for sensing, respectively, roll, pitch and yaw movements of said platform and for producing respectively roll, pitch, and yaw electrical position signals;
    roll, pitch, and yaw rate integrating gyroscopes mounted to said platform for producing electrical control signals responsive, respectively, to roll, pitch, and yaw movements of said platform; and
    a servo system connected to receive said roll, pitch, and yaw position signals from said resolvers and to receive said electrical control signals from said roll, pitch, and yaw gyroscopes, said servo system connected to said first, second and third coil windings for producing torque forces in said stator to oppose movement of said platform.

11. The system as recited in claim 2 in which said bearing is a spherical bearing.

12. The system as recited in claim 11 in which said spherical bearing includes an outer race, an inner race, and a plurality of ball bearings therebetween.

13. The system as recited in claim 2 which further comprises:
    a gimbal assembly attached to said platform and having freedom to move in elevation with respect to the horizontal plane of said platform;
    optical means mounted to said gimbal assembly for receiving visible and infrared light along a line-of-sight of said optical means;
    an elevation resolver mounted to said gimbal and connected to said platform for sensing movement in elevation of said optical means and producing a position indicating electrical signal therefrom; and
    an elevation torquer mounted to said platform and operatively connected to said optical means for moving said optical means in elevation with respect to said platform.

14. The system as recited in claim 13 in which said optical means is at least one mirror.

15. The system as recited in claim 13 which further comprises:
    a pitch rate integrating gyroscope mounted to said optical means for producing electrical control signals responsive to movements of said optical means in elevation relative to said platform.

16. The system as recited in claim 15 which further comprises:
    roll, pitch, and yaw resolvers mounted to said base and each of said resolvers operatively connected to said platform for sensing, respectively, roll, pitch, and yaw movements of said platform and for producing, respectively, roll, pitch, and yaw electrical position signals;
    roll, and yaw rate integrating gyroscopes mounted to said platform for producing electrical control signals responsive, respectively, to roll and yaw movements of said platform; and
    a servo system connected to receive said roll, pitch, yaw and elevation position signals from said resolvers and to receive said electrical control signals from said roll, pitch, and yaw gyroscopes, said servo system connected to said first, second, and third coil windings for producing torque forces in said stator for opposing movement of said platform and to said pitch torquer for controlling the elevation of said optical assembly line-of-sight.

17. The system as recited in claim 13 in which said platform system is mounted to a vehicle and further comprises:
   means attached to said vehicle for rotating said base in azimuth; and
   an azimuth resolver mounted to said vehicle and operatively connected to said base for sensing azimuthal movements of said base and for producing azimuthal electrical position signals.

18. The system as recited in claim 17 which further comprises:
   a pitch rate integrating gyroscope mounted to said optical means for producing electrical control signals responsive to movements of said optical means in elevation relative to said platform;
   roll, pitch, and yaw resolvers mounted to said base and each of said resolvers operatively connected to said platform for sensing, respectively, roll, pitch, and yaw movements of said platform and for producing respectively roll, pitch, and yaw electrical position signals; and
   a servo system connected to receive said roll, pitch, yaw, and elevation and azimuthal position signals from said resolvers and to receive said electrical control signals from said roll, pitch, and yaw gyroscopes, said servo system connected to said plurality of second means for producing a magnetic field for producing torque forces in said stator for opposing movement of said platform, to said pitch torquer for controlling the elevation of said optical assembly line-of-sight, and to said base rotating means for controlling the azimuth of said optical assembly line-of-sight.

19. The system as recited in claim 13 which further comprises:
   a target tracking system for producing electrical tracking control signals indicative of the position of a selected target with respect to said optical assembly line-of-sight, said target tracking system connected to said servo system; and
   said servo system including a control computer connected to said target tracking system for processing said tracking control signals, for processing said gyroscope control signals, and for controlling said servo system to maintain said line-of-sight aligned with said target.

20. The system as recited in claim 19 which further comprises:
   a manual control system connected to said servo system, said manual control system producing manual control signals for controlling said elevation torquer and said azimuth rotating means.

21. The system as recited in claim 17 in which:
   said azimuth rotating means includes a ring gear attached to said base; and
   an electric motor attached to said vehicle and having a spur gear engaging said ring gear.

22. A triaxis controllable platform comprising:
   a vertical center post having a vertical axis and an essentially horizontal base;
   a spherical bearing assembly having an outer race disposed on an upper end of said vertical center post and an inner race;
   a normally horizontal platform attached to and supported by said inner race thereby having freedom of motion in three mutually orthogonal axes;
   an annular stator having a thin wall, formed from non-magnetic material, attached to and dependent from said platform and disposed around and concentric to said center post axis;
   at least one first rotor magnet assembly attached to said base for producing a first magnetic field through said stator wall;
   a first stator electrical coil disposed on said stator wall and within said first magnetic field and oriented to cause movement of said platform along a first of said axes when energized by a direct electrical current;
   at least one second rotor magnet assembly attached to said base for producing a second magnetic field through said stator wall;
   a second stator electrical coil disposed on said stator wall and within said second magnetic field and oriented to cause movement of said platform along a second of said axes when energized by a direct electrical current;
   at least one third rotor magnet assembly attached to said base for producing a third magnetic field through said stator wall; and
   a third stator electrical coil disposed on said stator wall and within said third magnetic field and oriented to cause movement of said platform along a third of said axes when energized by a direct electrical current.

23. A stabilized platform system having five degrees of freedom for installation in a vehicle comprising:
   (a) a mounting structure attached to said vehicle;
   (b) a base;
   (c) rotation means for rotating said base in azimuth with respect to said mounting structure;
   (d) a platform;
   (e) bearing means for supporting said platform on said base such that said platform is movable relative to said base about roll, pitch and yaw axes;
   (f) a gimbal assembly attached to said platform and having freedom to move in elevation over predetermined limits of travel with respect to a horizontal plane of said platform;
   (g) drive means coupled to said gimbal assembly and said platform for moving said gimbal assembly in elevation relative to said platform;
   (h) a stator having a wall formed from non-magnetic material and depending from said platform;
   (i) a plurality of first means for producing a magnetic field and attached to said base, each of said first means adjacent said stator wall and arranged to produce a plurality of first magnetic fields transverse to and through said stator wall; and
   (j) a plurality of second means for producing a magnetic field and attached to said stator wall, each of said second means disposed within one of said first magnetic fields wherein selective excitation of said plurality of second means by an electrical current causes said platform to move about one or more of said roll, pitch and yaw axes.

24. The platform system as recited in claim 23 which further comprises:
   (a) first position sensing means coupled to said rotation means for sensing the position of said base in azimuth relative to said mounting structure;
   (b) second sensing means coupled to said gimbal assembly for sensing the position of said gimbal assembly in elevation relative to said platform;

(c) third, fourth and fifth sensing means coupled to said platform for sensing the position of said platform relative to said base in roll, pitch and yaw respectively;

(d) a roll rate gyroscope disposed on said platform;

(e) a yaw rate gyroscope disposed on said platform;

(f) a pitch rate gyroscope disposed on said gimbal; and (g) servo control system having inputs connected respectively to said roll, pitch and yaw rate gyroscopes and said third, fourth and fifth sensing means, and outputs connected respectively to said rotation means, said drive means, and said plurality of second magnetic field producing means;

(h) whereby said servo control system serves to stabilize said platform in roll, pitch and yaw.

25. The platform as recited in claim 24 in which:

said servo control system includes inputs connected respectively to said first and second sensing means, inputs for receiving externally generated azimuth and elevation control signals, and outputs connected respectively to said rotation means and to said gimbal drive means;

whereby said servo control system serves to orient said gimbal assembly in a desired elevation and azimuthal position.

26. The platform as recited in claim 24 in which said first, second, third, fourth and fifth position sensing means are resolvers.

27. The platform as recited in claim 23 in which said bearing means is a spherical bearing.

28. The platform as recited in claim 23 in which said rotation means includes:

a ring gear attached to said base;

a drive motor attached to said mounting structure and having a spur gear engaged with said ring gear; and said first position sensing means includes a first resolver.

29. In a system having optical means for transmitting or receiving an electromagnetic beam, a control system comprising:

(a) a mounting structure;

(b) a base rotatably mounted to said structure;

(c) a platform supported on said base by a bearing permitting movement in roll, pitch and yaw relative to said base, said platform supporting said optical means;

(d) a mirror gimbal assembly attached to said platform having freedom to move in elevation with respect to a horizontal plane of said platform;

(e) a mirror disposed in said mirror gimbal assembly and movable therewith for directing said beam to or from said optical means along a selected line of sight;

(f) a triaxis torquer for moving said platform in roll, pitch and yaw relative to said base;

(g) drive means mounted to said platform and operatively coupled to said gimbal assembly for moving said mirror in elevation relative to said platform; and (h) rotation means attached to said mounting structure and operatively coupled to said base for rotating said base in azimuth relative to said mounting structure.

30. The system as recited in claim 29 which further comprises:

(a) a first resolver mounted to said structure and operatively connected to said rotation means;

(b) a second resolver mounted to said platform and operatively connected to said mirror;

(c) a third resolver mounted to said base and operatively connected to said platform for sensing the position thereof in roll;

(d) a fourth resolver mounted to said base and operatively connected to said platform for sensing the position thereof in pitch; and (e) a fifth resolver mounted to said base and operatively connected to said platform for sensing the position thereof in yaw.

31. The system as recited in claim 30 which further comprises:

(a) a pitch rate gyroscope disposed on said mirror gimbal assembly;

(b) a yaw rate gyroscope disposed on said mirror gimbal assembly;

(c) a roll rate gyroscope disposed on said platform; and (d) said pitch, yaw and rate gyroscopes for producing electrical signals proportional to the rate of movement of said platform in pitch, yaw and roll respectively.

32. The system as recited in claim 31 which further comprises:

servo system means for controlling and stabilizing a line of sight of said optical means with respect to said mirror, said servo system means connected to receive position signals from said first, second, third, fourth and fifth resolvers, and control signals from said pitch, yaw and roll gyroscopes.

* * * * *